(12) United States Patent
Riffe

(10) Patent No.: US 6,308,819 B1
(45) Date of Patent: *Oct. 30, 2001

(54) ADVANCING TAILPIECE

(75) Inventor: Shirley Donnelly Riffe, Crab Orchard, WV (US)

(73) Assignee: Long-Airdox Company, Blacksburg, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/811,431

(22) Filed: Mar. 3, 1997

(51) Int. Cl.[7] .............................. B65G 15/08; B65G 21/14
(52) U.S. Cl. ............................................ 198/589; 198/828
(58) Field of Search ................................... 198/812, 828, 198/830, 861.1, 861.2

(56) References Cited

U.S. PATENT DOCUMENTS

| | | | |
|---|---|---|---|
| 2,796,969 | * 6/1957 | Russell | 198/589 X |
| 2,862,604 | 12/1958 | Craggs et al. | 198/139 |
| 3,204,755 | 9/1965 | Caine . | |
| 4,073,445 | 2/1978 | Clonch | 241/101.7 |
| 4,245,738 | * 1/1981 | Butcher et al. | 198/812 |
| 4,890,720 | 1/1990 | Brais | 198/592 |
| 5,590,757 | 1/1997 | Walter et al. | 198/812 |

FOREIGN PATENT DOCUMENTS

| | | |
|---|---|---|
| 86 16 317 | 11/1986 | (DE) . |
| 55-66412 | * 5/1980 | (JP) ...................................... 198/812 |
| 60-242115 | 12/1985 | (JP) . |

OTHER PUBLICATIONS

"Belt Conveyor Systems: Intermediate Sections" Long–Airdox Company (Oak Hill, WV 25901), 104 (1980).

* cited by examiner

*Primary Examiner*—Janice L. Krizek
(74) *Attorney, Agent, or Firm*—Piper Marbury; Rudnick & Wolfe

(57) ABSTRACT

The invention relates to an advancing tailpiece of a continuous belt conveyor system used in the mining industry. The advancing tailpiece is supported by telescopic booms extending from a support structure rising from the base of a tow car. The telescoping booms are pivotally connected to the support structure and the advancing tailpiece. The advancing tailpiece further includes a mechanical arm pivotally connected to the advancing tailpiece and having a telescopic boom. Carrying idler assemblies are loaded on the mechanical arm which is used to position the carrying idler assembly for attachment to an intermediate conveyor section of the continuous belt conveyor.

14 Claims, 3 Drawing Sheets

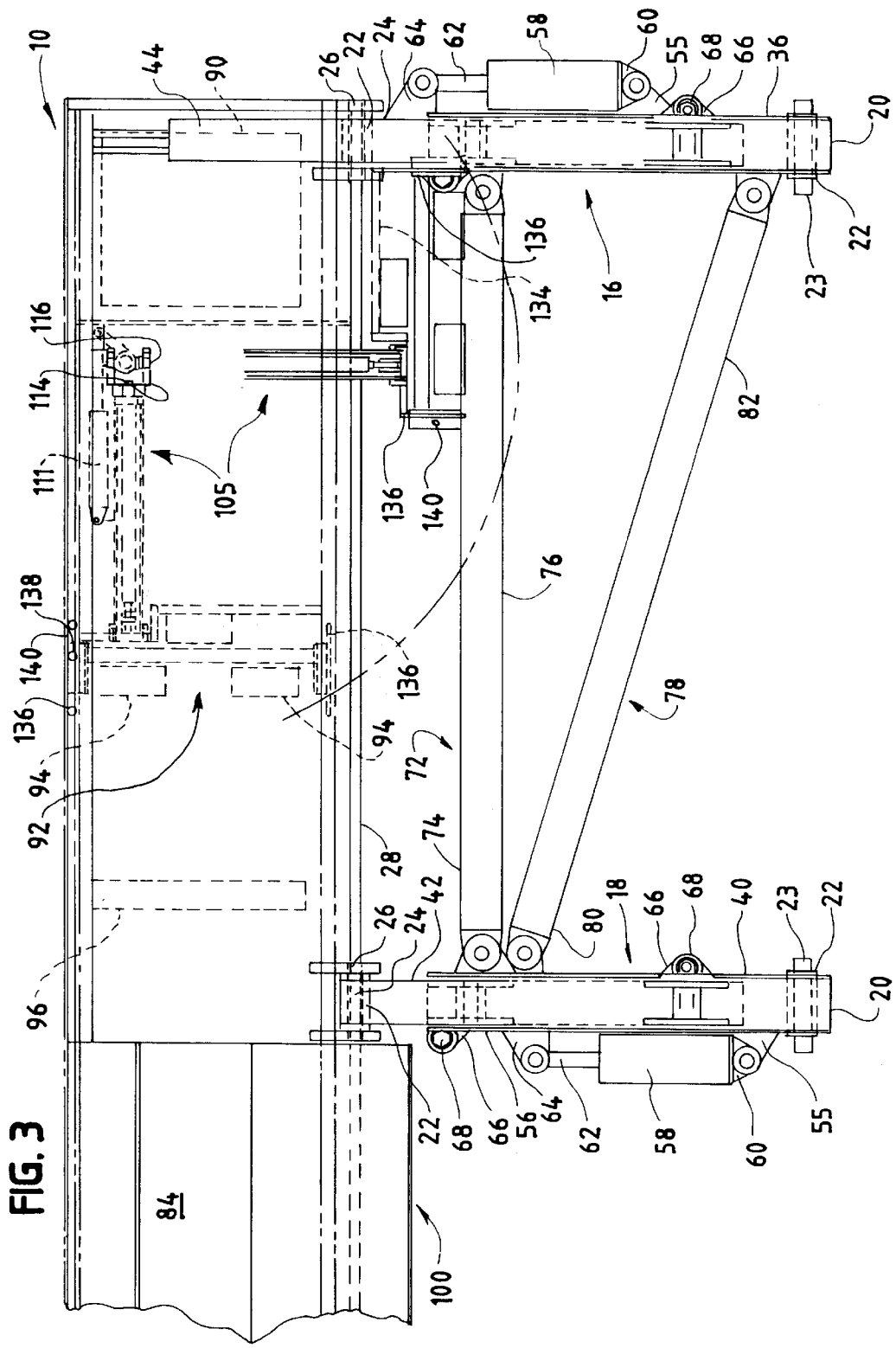

ADVANCING TAILPIECE

FIELD OF THE INVENTION

The present invention relates to continuous belt conveyor systems used in the mining industry, and particularly to an advancing tailpiece.

BACKGROUND OF THE INVENTION

Mining tunneling operations typically include a tunnel boring machine which cuts and fractures the rock and produces muck material. A transfer conveyor is towed by the tunnel boring machine. The transfer conveyor removes the muck material from the tunnel boring machine and usually conveys the muck material up and over to one side of the tunnel. The muck material is discharged to a receiving hopper of an advancing tailpiece which is also towed by the tunnel boring machine. The muck material is then loaded onto a continuous belt conveyor.

The support structure of the continuous belt conveyor is secured to the tunnel. However, the continuous belt conveyor must extend or advance with the advancing tunnel boring machine. The advancing tailpiece makes possible the advancing of the continuous belt conveyor. The advancing tailpiece is usually supported by one of the vehicles which is towed by the tunnel boring machine. The end loop of the belt is carried by a pulley of the advancing tailpiece. As the advancing tailpiece advances, the belt length gets longer as it is pulled out of a belt storage system, typically near the discharge end of the belt conveyor. The belt storage system is usually a cluster of pulleys which can be moved to allow the continuous belt conveyor to extend.

As the advancing tailpiece advances, the distance increases between the support structure of the conveyor and the pulley of the tailpiece, as well as the belt spanning therebetween. As the advancing tailpiece advances, return rolls are secured to the continuous belt conveyor system. The return rolls support the belt during the belt return path at the bottom of the continuous belt conveyor. Carrying idler assemblies must also be installed within the loop of the belt to support the belt during the load carrying portion of the path of the belt. The carrier idler assemblies must be installed through the frame of the tailpiece. The carrying idler assemblies are installed by workers on a frame of the continuous belt conveyor, typically using J-bolt/loop-nut arrangements. The carrying idler assemblies and return rolls form the support structure of the continuous belt conveyor. The carrying idler assemblies do not move with the advancing tailpiece and so they must be installed prior to the advancing tailpiece advancing beyond the distance the belt can be supported by the last installed carrying idler assembly and the advancing tailpiece.

To accommodate the worker, the frame of the tailpiece must include an access opening for the worker to climb into the advancing tailpiece to install the carrying idler assembly. The tailpiece typically includes 3 or 4 belt pulleys such as shown in U.S. Pat. No. 4,890,720. The number of pulleys, in part, dictates the size of the advancing tailpiece. The larger the tailpiece, the less space is available in the tunnel adjacent the tailpiece. This is an important consideration because in small bore diameter tunnels, for example, 10 foot to 11 foot diameter, the area where the advancing tailpiece is located becomes very congested as tunnel supply trains must pass by the advancing tailpiece, and due to other tunneling operation support functions that must be carried out in this area such as ventilation, dust collection, water pumps, electrical transformers, and tunnel structural support erection equipment.

The tow vehicle typically rides on steel rails or slides on skid rails and is towed by the mining machine. The movement of this vehicle as it is towed will not be an accurate line, therefore, in order to keep the advancing tailpiece located accurately on the belt centerline, there must be some method of moving the advancing tailpiece relative to the support car.

This is accomplished in the prior art with two horizontal extension booms to provide for lateral movement, two vertical tracks to provide vertical movement and two tilt cylinders to control the roll of the tailpiece about a longitudinal axis.

SUMMARY OF THE INVENTION

It is an object of the present prevention to provide an advancing tailpiece having a reduced dimension over the prior art.

It is a further object of the present invention to provide an advancing tailpiece having an improved method of installing carrying idlers.

It is still a further object of the present invention to provide an advancing tailpiece having an access opening for installing carrying idlers of reduced dimensions over the prior art.

It is yet a further object of the present invention to provide an advancing tailpiece which does not require a vertical track to provide for vertical movement.

BRIEF DESCRIPTION OF DRAWINGS

FIG. 3 is a part cross sectional top view and part plan top view of the advancing tailpiece of FIG. 1; and FIG. 4 is a plan view of a carrying idler assembly.

DETAILED DESCRIPTION OF INVENTION

Figure 1:
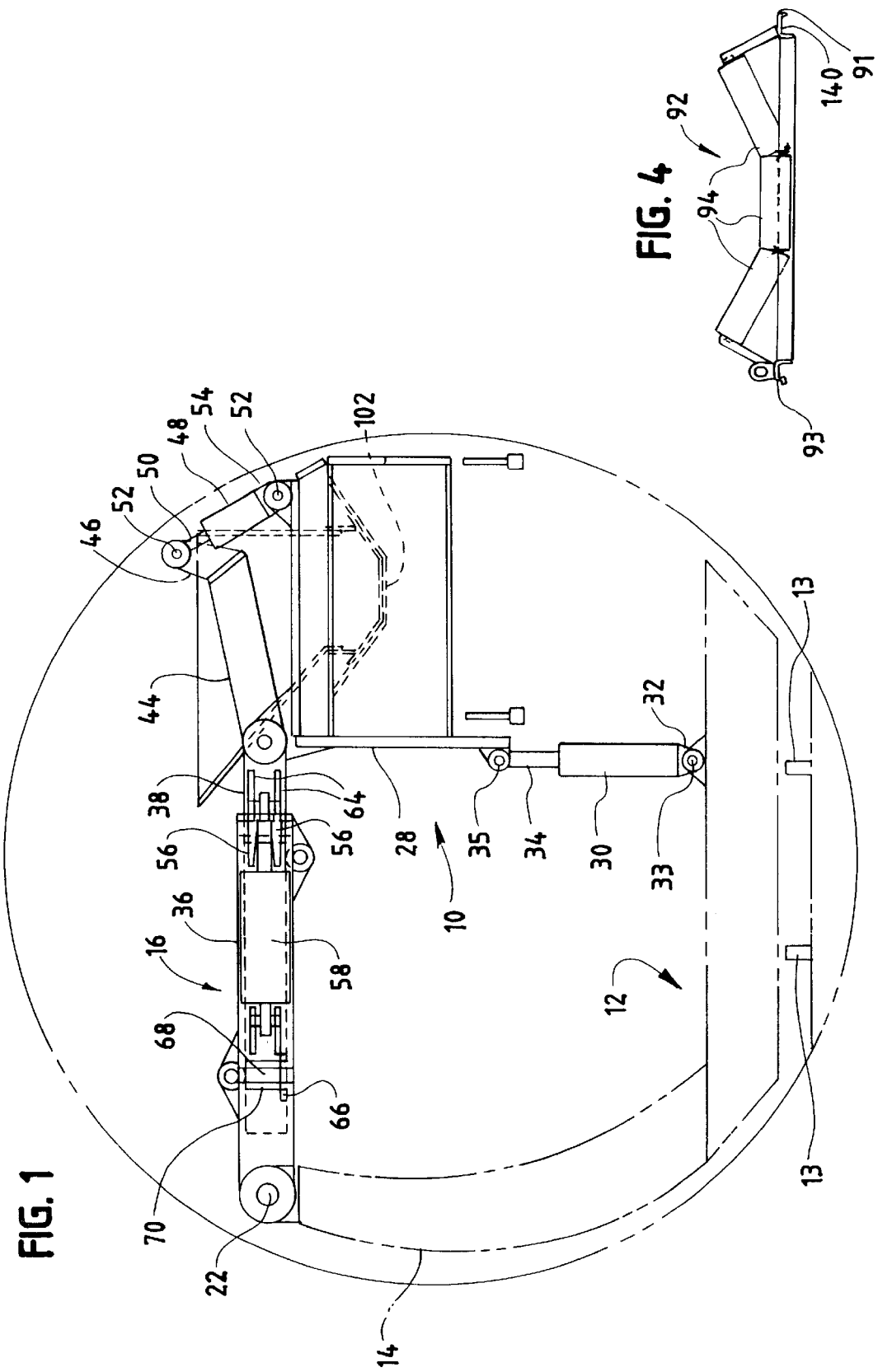
FIG. 1 is a part cross sectional, part plane view of an advancing tailpiece of the present invention, within a tunnel and supported by a tow vehicle.

Referring to FIG. 1, the advancing tailpiece 10 is shown to be supported by a tow vehicle 12. The tow vehicle 12 is typically one of several vehicles towed by the tunnel boring machine (not shown) along rails 13. The tow vehicle 12 includes a column or vertical structure 14 by which the advancing tailpiece 10 is supported by way of first telescope boom 16. FIG. 3 discloses a second telescoping boom 18, which is coupled to a further vertical structure (not shown).

The first ends 20 of the first and second telescoping boom 16, 18 include bushings 22, for pivotal connection to the respective vertical structure with pins 23. The second ends 24 of the first and second telescoping booms 16, 18 similarly including bushings 22 and pins 26 for pivotal connection to the frame 28 of the advancing tailpiece.

As seen in FIG. 1, the advancing tailpiece is also supported by the tow vehicle 12, by way of a vertical elevating cylinder 30 having a first end 32 pivotally connected with pin 33 to the tow vehicle 12 and a second end 34 pivotally connected with pin 35 to the frame 28 of the advancing tailpiece 10.

The first telescoping boom 16 includes an outer boom portion 36, and an inner boom portion 38. The second telescoping boom 18 also includes an outer boom portion 40 and an inner boom portion 42.

The inner boom portion 38 of the first telescoping boom 16, includes a leverage or extension portion 44, having a distal end 46. A tilt cylinder 48 includes a first end 50 having a pin 52 for pivotal connection to the distal end 46 of the extension portion 44. The tilt cylinder 48 includes a second end 54 having a pin 52 for pivotal connection to the frame 28, of the advancing tailpiece 10.

The outer boom portions 36, 40 include flanges 55 and longitudinally extending slots 56. Telescoping cylinder 58 includes first end 60 secured to respective flanges 55, and second end 62 mounted to flanges 64 of the inner boom portions 38, 42. The flanges 64 extend within the slots 56 of the outer boom portions 36, 40.

The outer boom portions 36, 40 include guide flanges 66, having guide rollers 68. The guide rollers 68 protrude through window 70 of the outer boom portions 36, 40 to engage the inner boom portions 38, 42 to guide the movement of the inner boom portions 38, 42 within the outer boom portions 36, 40.

FIG. 3 discloses a first connecting bar 72, connected between the first and second telescopic booms 16, 18 parallel to the longitudinal axis of the frame 28. The first connecting bar 72, includes a first end 74 connected to the outer boom portion 40 and a second end 76 connected to the outer boom portion 36. A second connecting bar 78 is connected between the first and second telescoping booms 16, 18, and angularly displaced with respect to the first connecting bar 72. The second connecting bar 78 includes a first end 80 connected to the outer boom portion 40 and a second end 82 connected to the outer boom portion 36.

Figure 2:
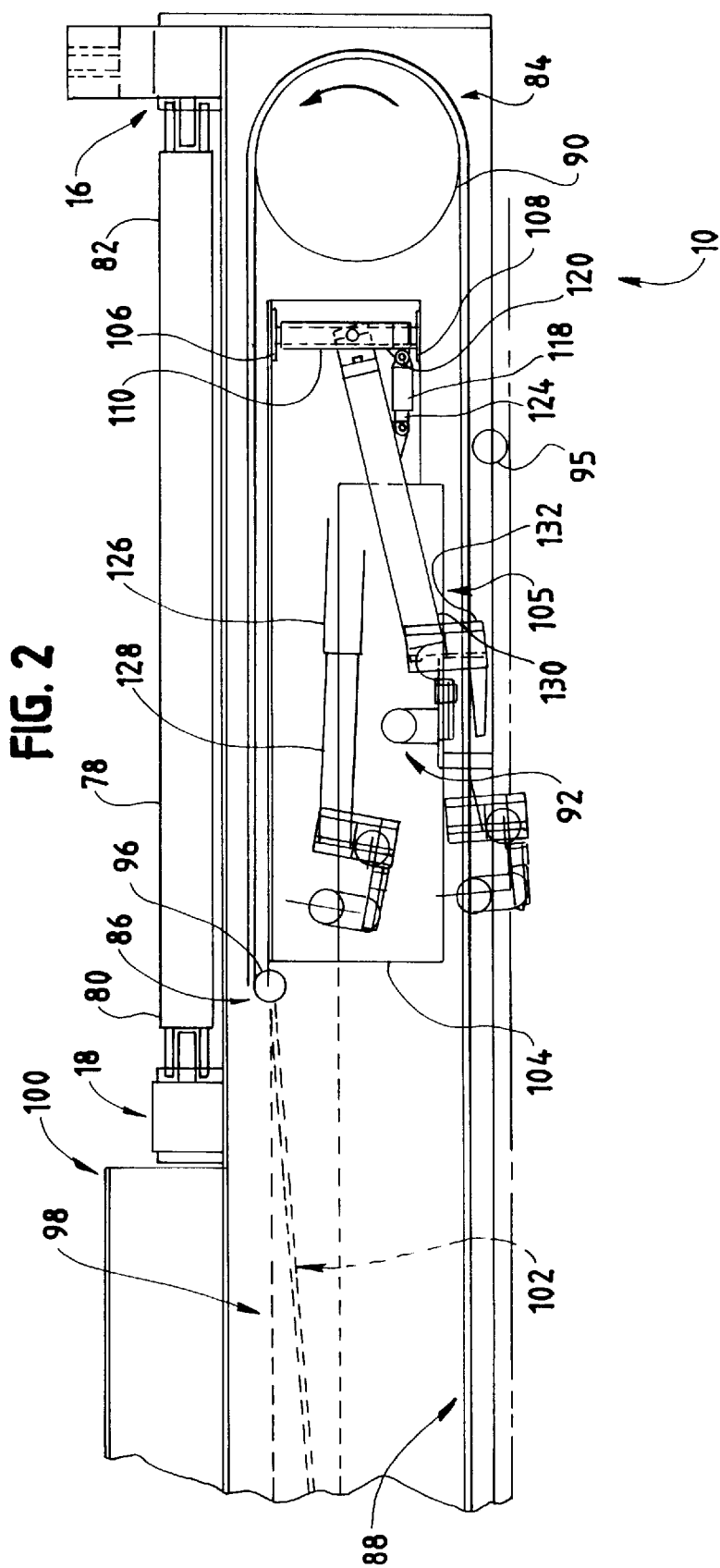
FIG. 2 is a part cross sectional, side view and part plan sideview of the tailpiece of FIG. 1.

FIG. 2 shows the belt 84 having a load portion 86 and a return portion 88. The belt 84 is part of the belt conveyor intermediate section (not shown). The intermediate section includes a plurality of spaced apart carrying idler assemblies 92 such as shown in FIG. 4. The carrying idler assembly 92, includes flanges 91, 93 and rollers 94. The rollers 94 are arranged so that as the belt 84 advances along the carrying idler assemblies 92, the belt 84 forms a trough to retain crushed rock and the like. The intermediate section (not shown) includes return rollers 95 (FIG. 2) which support the belt 84, along the return portion 88. The belt 84 is coupled to the advancing tailpiece 10 by way of the tail pulley 90. The belt 84 is supported by a straight roller 96. The belt 84 is flat along the load portion 86 between the straight roller 96 and the pulley 90. At portion 98 the belt 84 begins to take the shape of a trough as it moves closer to the first carrying idler assembly of the intermediate section (not shown). At portion 98 of the belt 84, the hopper 100 is located for receiving crushed rock and other muck material from the transfer conveyor (not shown) of the tunnel boring machine (not shown). To prevent the belt 84 from being damaged as the hopper 100 and belt 84 receive the crushed rock, trough-shaped steel plates 102 are located beneath the belt 84. With reference to the view shown in FIG. 2, the trough-shaped steel plates 102 provide a shallow bottom adjacent the straight roller 96. The bottom of the trough-shaped steel plates 102 increases gradually in depth as the plates 102 extend away from the straight roller 96. Another view of the steel plates 102 is shown in FIG. 1.

It is important to note that the required diameter of the single tail pulley 90 is no larger than what would normally be used at the receiving end of the belt conveyor if a standard fixed or non advancing tailpiece were used.

A rectangular access opening 104 is provided in the side of the frame 28 from which extends a mechanical arm 105. The mechanical arm 105 is shown in various extended positions in phantom lines. The mechanical arm 105 includes an upper bracket 106 and a lower bracket 108 which are secured to the frame 28. A column 110 is pivotally mounted to the upper and lower brackets 106, 108 for rotation about a vertical axis. A cylinder 111 shown in FIG. 3 is coupled to the mechanical arm 105 and is stroked to rotate the mechanical arm 105 about a vertical axis of the column 110. A telescopic boom 112 includes a first end 113 pivotally secured to the column 110 by a U-shaped bracket 114 and pins 116 to allow the telescoping boom 112 to be raised and lowered by a cylinder 118. The cylinder 118 includes a first end 120 pivotally coupled to an extended portion 122 of the column 110, and a second end 124 pivotally coupled to the telescoping boom 112. The telescoping boom 112 includes a first boom 126 and a second boom portion 128. The second end 130 of the telescoping boom 112, includes a cradle 132 for receiving a carrying idler assembly 92. The cradle 132 includes a transverse portion 134 from which extends prongs 136.

The advancing tailpiece 10 of the present invention operates as follows. As the tailpiece 10 advances forward, the belt storage (not shown) effectively increases the length of the belt 84 as the tail pulley 10 advances. In order to support the belt 84 at the return portion 88, the return roller 95 (see FIG. 2) is secured to the intermediate section (not shown) and below the advancing tailpiece 10. In addition, a further carrying idler assembly 92 is installed through the access opening 104 of the advancing tailpiece 10. Each return roller 95 and carrying idler assembly 92 must be installed before the advancing tailpiece 10 advances to a point where the intermediate section (not shown) and the advancing tailpiece 10 are no longer able to support the portion of the belt 84 suspended between the intermediate section (not shown) and the advancing tailpiece.

The mechanical arm 105 is positioned at the location as shown in FIG. 3 in solid lines, and the carrying idler assembly 92 is positioned onto the cradle 132 of the mechanical arm 105. The mechanical arm 105 is then positioned at the location shown in FIG. 3 in phantom lines. The mobility of the mechanical arm 105 allows the carrying idler assembly 92 (see FIG. 4) to be placed with the pin 138 extending through the hole 140 of the flange 91. The pins 138 extend from the intermediate section (not shown) in spaced apart relation corresponding to the positions the carrying idler assemblies 92 are to be installed. The mechanical arm 105 is then retracted away from the carrying idler assembly 92 and the J-bolt and loop nut are secured to the flange 93 of the carrying idler assembly 92. The present invention allows moving the advancing tailpiece 10 relative to the tow vehicle (not shown) to provide a new method of maintaining the advancing tailpiece 10 located accurately on the belt center line. The telescoping booms 16, 18 provide for lateral movement of the advancing tailpiece 10. The cylinder 48 controls the roll of the tailpiece 10 about a longitudinal axis. The vertical movement is accomplished by pivotally mounting the telescoping booms 16, 18 at the ends so that the telescoping booms 16, 18 can swing in an arc, as dictated by the cylinder 30.

What is claimed is:

1. An advancing tailpiece used in the mining industry, the advancing tailpiece to be supported by a support vehicle, the support vehicle having a support structure, the advancing tailpiece comprising:
   a frame;
   a means for positioning carrying idler assemblies within the frame, the positioning means includes a boom, the boom having a first end and a second end;
   means for angularly moving the boom through a horizontal plane and a vertical plane, the angular movement means coupling the first end of the boom to the frame;

means for temporarily cradling a carrying idler assembly, the temporary cradling means located at the second end of the boom, whereby during advancement of the tailpiece, the boom is capable of movement to a first position, in which the temporary cradling means extends at least partially outside the frame to receive a carrying idler assembly, and through the vertical plane and horizontal plane to a second position, in which the cradling means extends within the frame and is lowered with respect to the frame.

2. The advancing tailpiece of claim 1, wherein the angular movement means includes means for raising and lowering the second end of the boom.

3. The advancing tailpiece of claim 1, wherein the boom includes means for telescoping the second end with respect to the first end.

4. The advancing tailpiece of claim 1, wherein the first end is pivotally secured within the frame.

5. The advancing tailpiece of claim 1, further comprising a single belt pulley.

6. The advancing tailpiece of claim 1, wherein the angular movement means includes means for pivoting the boom about a substantially horizontal axis.

7. The advancing tailpiece of claim 6, wherein said angular movement means includes a substantially vertically extending column having a longitudinal axis, the column having means for rotating the boom about the longitudinal axis of the column, whereby the boom pivots about the longitudinal axis of the column between the first position and the second position, whereby in the first position the boom extends substantially perpendicularly from a longitudinal axis of the frame, and in the second position, the boom extends substantially parallel to the longitudinal axis of the frame.

8. The advancing tailpiece of claim 7, wherein the angular movement means includes a bracket at the first end of the boom, the angular movement means having means for pivotally connecting the bracket to the column for pivoting the boom about a substantially horizontal axis.

9. The advancing tailpiece of claim 1, wherein the frame includes a first side and a second side, means for supporting the frame, the frame supporting means having a longitudinally extending portion, the longitudinally extending portion having a first end and a second end, the first end having means for pivotally connecting the longitudinally extending portion to the support vehicle, the second end having means for pivotally connecting the longitudinally extending portion to the frame, means for tilting the frame about a horizontal axis extending through the pivotal connection means of the second end of the longitudinally extending portion, the tilting means coupled to the frame and the frame supporting means, and means for elevating the frame having a first end and a second end, the first end having a means for pivotal connection to the support vehicle, the second end having means for pivotal connection to the frame.

10. The advancing tailpiece of claim 9 wherein the frame supporting means includes boom means.

11. The advancing tailpiece of claim 9, wherein the frame supporting means includes a first telescoping boom and a second telescoping boom, the first telescoping boom and second telescoping boom having first and second ends, the first ends having means for pivotally connecting the longitudinally extending portion to the support vehicle, the second ends having means for pivotally connecting the longitudinal extending portion to the second side of the frame, the first telescoping boom having an arm extending from the second end of the first telescoping boom, the arm having a distal end, the tilting means having a telescoping cylinder, the telescoping cylinder having a first end and second end, the first end having means for pivotal connection to the distal end of the arm, the second end having means for pivotal connection to the first side of the frame, and the elevating means includes a telescoping cylinder.

12. The advancing tailpiece of claim 11, wherein the first and second telescoping booms include inner and outer telescoping portions, the inner telescoping portions include the second ends of the first and second telescoping booms, the outer telescoping portions having distal ends opposite the first ends of the first and second telescoping booms, the advancing tailpiece including first and second connecting bars, the first connecting bar having a first end and a second end, the first end pivotally coupled to the distal end of the outer telescoping portion of the second telescoping boom, the second end pivotally coupled to the distal end of the outer telescoping portion of the first telescoping boom, the second connecting bar having a first end and a second end, the first end pivotally coupled to the outer telescoping portion of the second telescoping boom adjacent the first end of the first connecting bar, the second end pivotally coupled to the outer telescoping portion adjacent the first end of the first telescoping boom.

13. The advancing tailpiece of claim 12, wherein the outer telescoping portions each include first and second guide rollers located on opposite sides and opposite ends of the outer telescoping portion, the guide rollers rotatingly engaging the respective inner telescoping portions.

14. The advancing tailpiece of claim 12, wherein the first and second telescoping booms each include a telescoping cylinder, the telescoping cylinders having first ends coupled to the outer telescoping portions, the telescoping cylinders having second ends coupled to the respective inner telescoping portions.

\* \* \* \* \*